US008756390B2

(12) United States Patent
Chu et al.

(10) Patent No.: US 8,756,390 B2
(45) Date of Patent: Jun. 17, 2014

(54) METHODS AND APPARATUSES FOR PROTECTING DATA ON MASS STORAGE DEVICES

(75) Inventors: Simon Chu, Chapel Hill, NC (US); William J. Piazza, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 129 days.

(21) Appl. No.: 11/294,230

(22) Filed: Dec. 5, 2005

(65) Prior Publication Data

US 2007/0130434 A1    Jun. 7, 2007

(51) Int. Cl.
*G06F 12/00* (2006.01)
*G06F 13/00* (2006.01)

(52) U.S. Cl.
USPC ............ 711/163; 711/100; 711/111; 711/154

(58) Field of Classification Search
CPC ................................. G06F 12/14; G06F 3/062
USPC ................................... 711/111, 100, 154, 163
See application file for complete search history.

(56) References Cited

U.S. PATENT DOCUMENTS

| 5,610,981 | A | 3/1997 | Mooney et al. |
| 6,032,257 | A | 2/2000 | Olarig et al. |
| 6,098,171 | A | 8/2000 | Johnson et al. |
| 6,463,537 | B1 | 10/2002 | Tello |
| 6,697,963 | B1 | 2/2004 | Nouri et al. |
| 6,901,511 | B1 * | 5/2005 | Otsuka ........................... 713/164 |
| 6,904,493 | B2 * | 6/2005 | Chiao et al. .................... 711/103 |
| 7,072,211 | B2 * | 7/2006 | Newell ...................... 365/185.04 |
| 7,159,120 | B2 * | 1/2007 | Muratov et al. ................ 713/182 |
| 2003/0097585 | A1 | 5/2003 | Girard |
| 2004/0003262 | A1 | 1/2004 | England et al. |
| 2005/0081071 | A1 * | 4/2005 | Huang et al. ................... 713/300 |
| 2005/0182951 | A1 * | 8/2005 | Sohn .............................. 713/189 |
| 2005/0186954 | A1 * | 8/2005 | Kenney .......................... 455/420 |
| 2005/0193208 | A1 * | 9/2005 | Charrette et al. .............. 713/182 |
| 2009/0024746 | A1 * | 1/2009 | Welch ............................ 709/228 |

FOREIGN PATENT DOCUMENTS

WO      WO 02/095571 A1    11/2002

* cited by examiner

*Primary Examiner* — Tuan Thai
(74) *Attorney, Agent, or Firm* — Katherine S. Brown; Schubert Law Group PLLC

(57) ABSTRACT

Methods, apparatuses, and media to protect sensitive information in data storage devices are disclosed. Embodiments comprise a method of transmitting and receiving unique identification information of components of a computer system, comparing the information with previously saved information in the storage device, and not allowing access to the data if the information is substantially different. In some embodiments, the storage device may simply prevent access to the information. In other embodiments, the storage device may erase the information after detecting a change in the computer system. In other embodiments, the storage device may provide various options for effectively resetting the unique identification stored in the data storage device so that the device may be used in an altered system.

19 Claims, 10 Drawing Sheets

METHODS AND APPARATUSES FOR PROTECTING DATA ON MASS STORAGE DEVICES

FIELD

The present invention generally relates to the field of data storage devices. More particularly, the present invention relates to methods, apparatuses, and media to protect data on storage devices.

BACKGROUND

Computer systems are ubiquitous and becoming omnipresent. Computer systems, including relatively simple microprocessor-based systems, are found in all types of electronic systems and devices. One can easily find various types of personal computers, such as desktop systems and laptops, being used in company buildings, manufacturing facilities, and in homes. Additionally, one can readily find information technology (IT) computer systems comprising mass information servers, such as those that serve as the backbone of the Internet. Additionally, computers can readily be found in personal electronic devices used every day in our personal lives. Examples include portable electronic devices, such as hand-held computers, palm-type computers, portable music players, and portable global positioning systems.

While the actual number of different computer system architectures and arrangements is staggering, computer systems tend to have several basic components. Generally, computer systems contain one or more central processing units (CPUs) located on a motherboard, or system planar, which interacts with volatile and non-volatile memory (read only memory, or ROM, and random access memory, or RAM), a display monitor or screen, and a keyboard or other input device. These computer systems also operate one or more portable storage devices, such as floppy disk drives and thumb drives, and one or more mass storage devices, such as a fixed disk storage device or hard drive. This general concept of a computer system configuration describes a vast majority of business and individual desktop and personal computers, as well as various portable computers, such as notebook computers and palm-sized computers.

As noted above, one ore more CPUs interact with various system components, such as memory and I/O devices. CPUs generally communicate with these system devices by way of a data bus. While a CPU may interact directly with certain system devices, such as memory, using a data bus, they generally only interact with external devices, such as storage devices and keyboards, by way of an input-output (I/O) controllers attached to hardware data buses. Data storage devices, such as fixed and portable disks, are generally configured to operate on such hardware data buses. That is to say, a computer system may use hardware data buses to communicate with, and store data on, mass data storage devices.

There is a growing need for protecting information on these data storage devices, including hard drives. Every day people collect and store more and more information in mass storage devices of computer systems. A lot of these data is sensitive in nature. A business or professional person, such as an attorney or a medical doctor, may store information that must be kept confidential, such as privileged communications from clients or results of medical tests. Patents, trade secrets, and other types of proprietary information and intellectual property may also be stored on a hard drive or other mass data storage device. Individuals also store private information, unrelated to business or other productive activities, such as daily diary entries or letters to loved ones. In the wrong hands, such sensitive data may cause companies hardships, embarrass individuals, and even lead to identity theft. Additionally, if company proprietary or sensitive information ends up in the hands of unintended persons, a company may risk losing a competitive edge.

Sensitive information stored on hard drives and other similar data storage devices may fall into the hands of unauthorized people in a variety of ways. Data storage devices have become smaller and more easily moved from one system to the next, and many computer systems use standard data storage devices, such as Intelligent Drive Electronics® (IDE) hard drives, that are purposely engineered to be easily moved from one computer to the next. Consequently, hard drives are routinely extracted from computer systems and reinstalled in other computer systems. For an example of how this may create a problem, consider many small and large businesses. Many businesses lease computer systems and equipment. After the term of the lease expires, the businesses may relinquish the equipment back to the equipment owner. If the companies only password protect the computer systems and fail to erase the data before returning the computer equipment, the equipment owner may extract the hard drives and install them in systems where the password feature is disabled, enabling the owner almost immediate access to sensitive or proprietary data stored on the drives. Additionally, businesses and individuals frequently have their computer systems upgraded by computer repair facilities, replacing such items as memory and mass storage devices. If the business or individual does not take steps to erase sensitive data from a storage device before having the system upgraded, the computer repair facility may redeploy the storage device containing the information to the computer system of another customer. Obviously, the other customer would have access to the sensitive data stored on the device.

System security has become an important issue. Various hardware, software, or combination approaches with increased capability and/or versatility have been developed in the industry to meet the data security needs of computer users. However, protecting sensitive information stored on hard drives and other mass storage devices is not easy for individuals or businesses today, given the current state of technology. While there are various methods for protecting sensitive information, almost all of the methods require user interaction for true security. Additionally, even when most methods are properly implemented and used, they prevent unauthorized access only part of the time, such as when the equipment and information are in a controlled environment.

One basic method of protecting data in computer systems and on hard drives is by using a password. This basic security measure has numerous shortcomings. First, many users do not bother using passwords, primarily due to the inconvenience. Second, most password protection schemes store passwords in erasable memory on the motherboard. Skilled computer users can easily erase this memory and defeat this method. Third, many password methods are implemented at the basic input-output system (BIOS) level, executed only during the boot process, and are not integrated with the data storage devices. In other words, people can easily circumvent this security method by extracting the storage device from a computer system having the password BIOS routine enabled and installing the device in a computer system having the password BIOS routine disabled. Since the password routine is in the computer system and not the storage device, a person may view sensitive information stored on the device by simply installing it in another computer system that has no password feature. For the relatively small percentage of storage devices that do have a password feature implemented within the hard drive, such that the password feature would be available in any system the hard drive is installed, this configuration still has major drawbacks. Many users do not enable it, either because they are not aware of its availability or, more frequently, users disable it because they consider it cumbersome to enter a password every time the computer is started. Another frequent trouble encountered by drives that do have device password routines is that people still are often unable to use it because of lack of BIOS support on the motherboard. Lastly, some storage devices are "hot pluggable", meaning they can be installed after the computer system is up and running, which generally bypasses many password checking routines.

Another method of protecting sensitive data stored on hard drives and other mass storage devices involves the technique of encryption. In other words, data and information are first scrambled before being saved in the storage device, such that they become unintelligible without a decryption key. Similar to the password method, this method also has its drawbacks. One major drawback is system performance. The process of encrypting data before storing them generally slows down system performance. System performance is usually degraded because of the extra steps of encrypting data before storage, and decrypting data upon retrieving them. In other words, the CPU and I/O systems generally must wait for the storage device to encrypt and store data before sending more information to the device. Likewise, the CPU and I/O systems must again wait for the storage device to decrypt or unscramble the data after a read request. Additionally, some operating systems and programs are simply incompatible with storage devices that use encryption methods.

Given the available techniques for protecting sensitive information stored on hard drives and other data storage devices, and the associated problems with the current techniques, computer users need automatic methods of protecting sensitive information against unauthorized or surreptitious viewing and usage. The methods need to protect the information from unauthorized access when sensing an environment change, such as the change corresponding to relocation of a hard disk drive from one system to another. The methods also need to be automated, not relying on human intervention.

SUMMARY

The problems identified above are in large part addressed by methods, apparatuses, and media to protect sensitive information in data storage devices. One embodiment comprises a method to protect the sensitive information by using serial numbers and other numbers of computer system components. The method generally involves gathering unique identification numbers from the connected computer system components, storing them in nonvolatile memory within the storage device, and verifying that the numbers are sufficiently similar during each startup of the computer system and/or hard drive. In various embodiments, the storage device may respond to changes in the computer system by preventing access to the data in the device, or by erasing the data altogether.

Another embodiment comprises an apparatus for protecting sensitive data contained in a storage medium. The apparatus may comprise a data bus, an integrated circuit for retrieving information stored in the storage medium, a device for sensing or reading the data from the storage medium, and an authorization element that compares stored data pertaining to the computer system in which the apparatus was originally installed with current data of the computer system to see if the computer system has changed. If the computer system has changed, the authorization element may prevent the integrated circuit from transferring information from the storage medium. The apparatus may also erase the data from the storage medium under certain conditions. Alternatively, the apparatus may allow access to the information if the apparatus receives an authorization command.

A further embodiment comprises a machine-accessible medium containing instructions for a machine to restrict access to data stored in a mass storage device, based on changes in a computer system coupled with the device. Generally, the instructions involve comparing stored computer-related identification information with current computer-related identification information and restricting access to the data if the two sets of information are substantially different. Alternatively, the instructions may cause the storage device to erase the data under certain conditions.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

Figure 1:
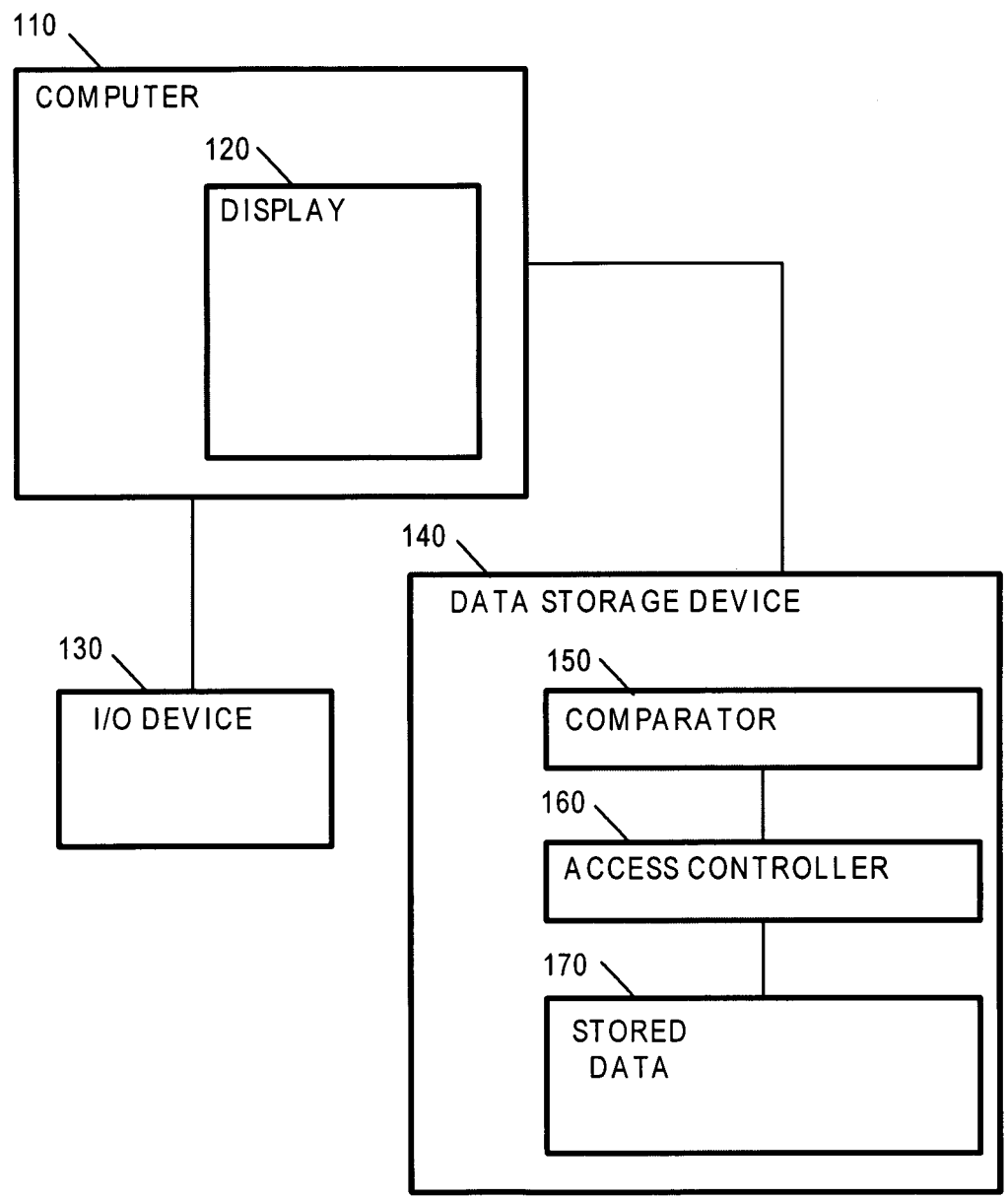
FIG. 1 shows block diagram of a system having a computer coupled to a mass storage device.

The following is a detailed description of example embodiments of the invention depicted in the accompanying drawings. The example embodiments are in such detail as to clearly communicate the invention. However, the amount of detail offered is not intended to limit the anticipated variation of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods, apparatuses, and media for protecting sensitive data on fixed disk drives and other storage devices are disclosed. New techniques for protecting sensitive data on mass storage devices that may be intentionally or unintentionally turned over to third parties who may have interests adverse to those of the original device owners are discussed. Embodiments comprise a method of capturing machine or system-specific information at boot-up time and verifying that such information has not changed since the last time the system was booted. In these embodiments, apparatus software and/or hardware may intervene in the normal scheme of the storage device operation and prevent the sensitive data from being extracted or read. In some embodiments, data-protecting logic located in state machines or read only memory (ROM) of the storage device electronics may protect the data from being examined. In other embodiments, the software may be stored in alterable memory devices of the storage device electronics. In further embodiments, such logic may even reside in the storage medium, loaded, and executed during the boot process.

The method of protecting the data, or sensitive information, varies in different embodiments. In some embodiments, the storage device will merely prevent a user from accessing the sensitive information. In other embodiments, the storage device may go one step further and erase the sensitive data before allowing a user to store data on the storage device. In even further embodiments, the storage device may prevent unauthorized accesses to the data for a certain number of boot-up cycles, whereupon the device will then erase the data and start functioning as a normal storage device.

While portions of the following detailed discussion describe many embodiments comprising new techniques for protecting sensitive data in fixed disks, a person of ordinary skill in the art will recognize that the following invention may be practiced in a variety of different storage devices, such as flash memory drives, optical storage devices, and even portable hard drives. All methods of practicing the invention are interchangeable. Further, embodiments discuss comparing serial numbers of the motherboards for personal computer systems, but one of ordinary skill in the art will recognize that the techniques disclosed herein may utilize an almost endless variation of computer system numbers, including unique identification numbers of client-server systems and redundant array of independent disks, for alternative embodiments when employed in accordance with similar constraints to perform substantially equivalent functions.

We turn now to FIG. 1, which shows an embodiment of a system having a computer 110 coupled to a data storage device 140. In some embodiments, data storage device 140 may be an internal fixed disk drive. In other embodiments, data storage device 140 may be a solid-state drive, such as a flash memory drive. Additionally, different embodiments may employ different methods of coupling data storage device 140 with computer 110. For example, in some embodiments data storage device 140 may be coupled with computer 110 by an internal ribbon cable. Alternate embodiments may us an external bus connection or even a serial data cable.

Computer 110 may present information to a user via display 120. In some embodiments, display 120 may be a cathode-ray-tube monitor. In other embodiments, display 120 may be a liquid crystal display screen or a thin-film transistor flat panel monitor. Additionally, the user may enter information into computer 110 by way of input-output (I/O) device 130, which may be a computer keyboard. For example, the user may use I/O device 130 to enter a series of alphanumeric characters in response to a question generated by computer 110 and shown to the user via display 120.

Data storage device 140 may contain information, such as stored data 170, that a user considers sensitive, or even proprietary. For example, stored data 170 may be confidential company information, such as contracts or trade secrets. An owner of computer 110 and data storage device 140 may desire to protect stored data 170, or prevent stored data 170 from being accessed, or divulged, in the possible event that data storage device 140 is separated from computer 110 and ends up in the hands of an unknown third party. For example, the owner may have data storage device 140 replaced at a computer service center with a modern storage device containing more storage capacity, but forget to erase stored data 170 before doing so.

Data storage device 140 may employ a comparator 150 and an access controller 160 to prevent a third party from accessing stored data 170. For example, comparator 150 may compare unique information, obtained from computer 110 during computer 110 initialization, with information stored in data storage device 140. If the unique information matches, or substantially matches the information stored in data device 140, then comparator 150 may permit access controller 160 to retrieve stored data 170 and transfer such data to computer 110. However, if comparator 150 determines that the unique information is different, or substantially different, from the information stored in data device 140, comparator 150 may prevent access controller 160 from retrieving stored data 170. Such unique information may be different in the case where data storage device 140 is removed from computer 110 and installed in, or coupled to, a different computer.

The unique information that data storage device 140 receives from computer 110 and stores for later comparison may vary in different embodiments. For example, in one embodiment data storage device 140 may receive and store a serial number or a model number of a computer 110 motherboard. In other embodiments, data storage device 140 may store several serial numbers or only a portion of one serial number. The amount of unique information stored relative to the amount of unique information received may also vary from embodiment to embodiment. For example, in some embodiments data storage device 140 may store relatively large numbers of bits of data, such as all of the data bits corresponding to the motherboard serial number and model number. In other embodiments, data storage device 140 may store relatively few bits of data, such as the last three bits of data corresponding to the motherboard model number.

In order to better explain how a data storage device, such as data storage device 140, may protect sensitive data contained within the device, we continue now with a more detailed discussion of how various embodiments with computer and microprocessor-based systems may start up and access mass storage devices. Computer systems may typically be booted, or initialized, during a power-up process using software algorithms, called firmware, stored within read only memory (ROM) on the motherboard. In many computer system embodiments, this firmware may be referred to as the basic input-output system (BIOS) program. Included in the BIOS may be a Power-On-Self-Test (POST) code, or program, which causes the central processing unit (CPU) to perform a number of predefined tests on system hardware. For example, the POST program may test the system random access memory (RAM) and check various ports and USB ports for I/O devices, such as a keyboard and a mouse.

Assuming the initial tests and queries mentioned above are successful, the BIOS code may then communicate with various attached hardware to initialize or reset them and exchange operating information with them. For example, the BIOS may retrieve necessary operating information from a hard drive, such as the number of platters, heads, and sectors. The BIOS may also send information to the hard drive so that the hard drive may operate properly, such as the compatible addressing modes for transferring data to and from RAM. They may also send auxiliary information to the hard drive, such as the CPU type, motherboard model number, and system serial numbers. This process of exchanging data may be referred to as handshaking. An important thing to note about this handshaking, at least in the case of storage devices, is the fact that system specific information may be transferred between computer systems and the storage devices.

After the handshaking process is completed for other various system components and devices connected to the motherboard, such as display adapters and other I/O cards, the BIOS may store information acquired during the boot process. The BIOS may store information about the hardware of the computer system in an area of memory that is not erased when the computer is turned off. In personal computer systems, this non-volatile memory may be referred to as complementary metal oxide semiconductor (CMOS) RAM. Finally, after performing these initializing hardware tests and exchanging information with various I/O hardware, the BIOS then may read a portion of the operating system from the hard drive and transfer this portion of code to RAM. The BIOS may complete the boot process by transferring execution control of operating instructions for the CPU to a designated starting instruction of the operating system, which again may now be stored RAM. Under direction of this operating system, the CPU and computer system may then perform tasks typically performed by computers for users. The computer may perform these tasks by continuing to execute program instructions stored in RAM and interacting with various I/O devices, such as the keyboard, a mouse, the computer monitor, and the hard drive. For example, the computer may load programs from a hard drive into RAM and allow a user to perform various tasks, such as word processing, solving calculations, reading email, and surfing the Internet. While using the computer and performing these tasks, users often save information to hard drives and other storage devices for later use. As one may see, utilization of a hard drive or other mass storage device is often central to the overall operation of a computer system.

Figure 2:
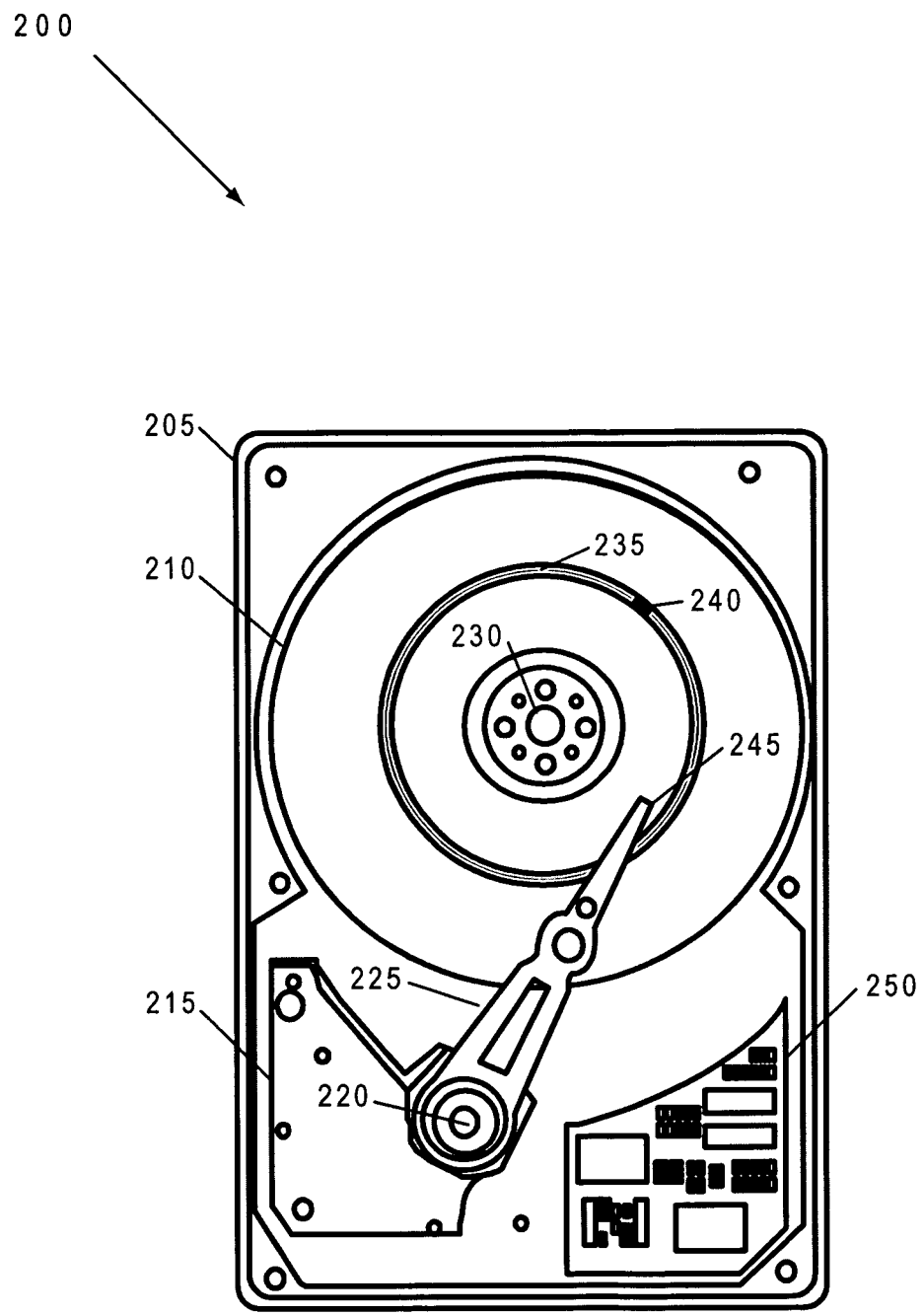
FIG. 2 depicts a simplified plan drawing of a mass storage device.

To explain how one may protect sensitive information stored on a hard drive, we turn to FIG. 2. FIG. 2 depicts a simplified plan view of a hard disk drive 200 which may be used in numerous embodiments. The vast majority of desktop and laptop computers in operation today may employ a hard disk drive similar to hard disk drive 200. Additionally, mainframe computer systems and supercomputers may normally be connected to hundreds of such hard disk drives. All such computer systems may benefit from the various embodiments described herein.

An enclosure 205 may house and protect the mechanical and electronic components of hard disk drive 200. Hard disk drive 200 may have a platter 210, comprised of a rigid circular magnetic media that is rotated at thousands of revolutions-per-minute around a center spindle 230. As platter 210 is rotated, normally by a small motor attached to spindle 230, data may be stored using a methodical and dedicated data arrangement. For example data may be arranged and stored in a series of concentric tracks and sectors, similar to track 235 and sector 240. While not shown in FIG. 2, a single track, such as track 235, may have numerous sectors. Additionally, platter 210 may contain tens and hundreds of tracks similar to track 235, located from the outer perimeter of platter 210 to the inner center spindle 230.

Information may be transferred into and out of the magnetic media of platter 210 by way of a read-write head 245, which may ride several microns away from the surface of platter 210 as platter 210 rotates around spindle 230. Read-write head 245 may be moved to various locations of the surface of platter 210, while platter 210 rotates, by swinging actuator arm 225 around an actuator axis 220 using an electro-mechanical actuator 215. By rotating platter 210 and swinging read-write head 245 around actuator axis 220, hard disk drive 200 may store data in tracks and sectors over most all of the magnetic media of platter 210.

Operation of the motor which rotates spindle 230, operation of the actuator 215, and operation of the read-write head 245 may all be controlled from one or more circuit boards located within hard disk drive 200, such as circuit board 250. Circuit board 250 may serve as the central operating part of hard disk drive 200. For example, circuit board 250 may not only operate the electro-mechanical portions of hard disk drive 200, such as the actuator 215 and read-write head 245, but it may also communicate with the computer system in which hard disk drive 200 is installed. For example, circuit board 250 may receive information from the computer system and store the information on platter 210 by moving and activating read-write head 245. Additionally, circuit board 250 may receive information retrieval request from the computer system and position read-write head 245 so as to retrieve the requested information stored on platter 210.

In storing and retrieving this information, circuit board 250 may utilize both ROM and RAM memory, located on or attached to circuit board 250. Similar to a CPU in a computer system, a microprocessor on circuit board 250 may execute programs and store information in both volatile and nonvolatile memory devices, such as ROM, RAM, and flash memory. As mentioned before, circuit board 250 may communicate with the computer system BIOS, communicating necessary operating information to the computer, such as the number of tracks and sectors contained on platter 210, like track 235 and sector 240. Additionally, circuit board 250 may receive information from the computer system, such as serial numbers and model numbers of the motherboard and I/O cards. Such information received from the computer system may be retrieved during each boot cycle of the computer system, as well as each time the hard disk drive 200 is inserted or plugged into the computer system while the computer system is operating, often referred to as "hot plugging" a drive. Each time this information is received, the electronics of circuit board 250 in hard disk drive 200 may compare the information reported by the computer system and compare this current information with information that was stored during a previous startup. If the information is consistent, indicating that the hard drive is currently installed in the same computer system, then the electronics of circuit board 250 may be programmed to allow hard disk drive 200 to operate normally. However, if the information is inconsistent, then the electronics of circuit board 250 may prevent hard disk drive 200 from operating normally. For example, after encountering a comparison difference, hard disk drive 200 may simply reject or ignore further read-write requests from the computer system. Additionally, hard disk 200 may transmit an error code to the computer system, informing the computer system that the security measure has been invoked and requires user intervention before the hard disk 200 will operate properly.

While the mass storage device in FIG. 2 is a hard disk system, one skilled in the art will realize that various other types of data storage devices may be substituted for substantially similar results in alternative embodiments. For example, instead of a magnetic media fixed disk drive, the computer system may employ an optical storage drive. Alternatively, in other embodiments, the storage device containing the sensitive information may not be an electro-mechanical device, but may instead be a purely electronic device, such as flash memory drive or other similar nonvolatile memory data storage device.

Additionally, while hard disk drive 200 employs a single platter 210 with a single read-write head 245, other embodiments may have numerous platters and numerous read-write heads. In further embodiments, the computer system may employ more than a single storage device. For example, a computer system acting as a server for a business may be connected with numerous hard disk drives, such as a redundant array of independent disks (RAID) drives. Each single storage device may be programmed to protect data stored within the device independently, or electronics controlling the devices may collectively protect the data stored on all of the devices.

Figure 3:
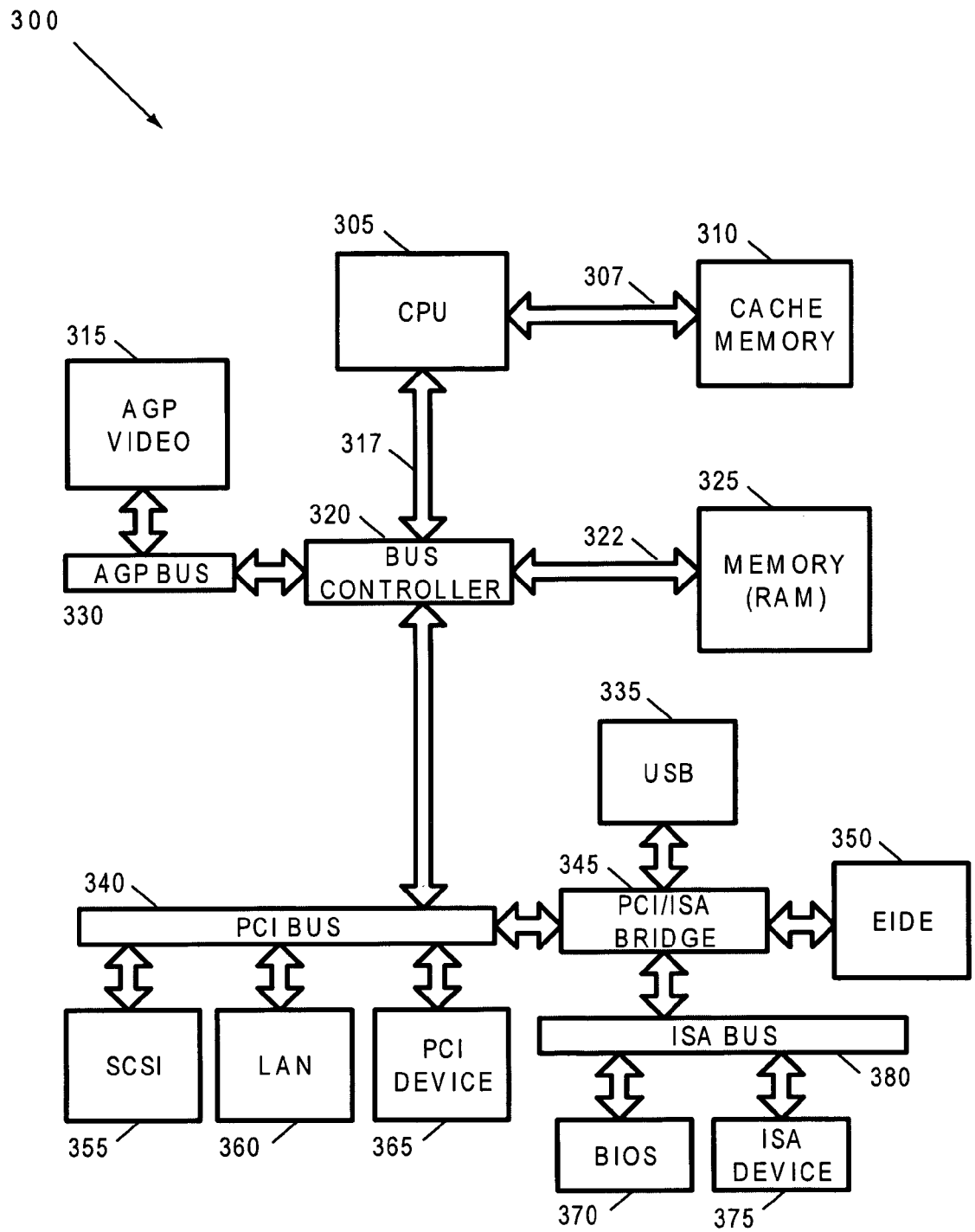
FIG. 3 depicts a system drawing of a computer system, including a central processing unit, a bus, an input-output controller, random access memory, a basic input-output controller, and different ports for attaching storage devices.

Turning now to FIG. 3, we see a computer architecture diagram illustrating how a storage device may be incorporated into a computer system. Computer system 300 has a CPU 305 coupled to cache memory 310 via a backside bus 307. Additionally, frontside bus 317 couples CPU 305 to a bus controller 320. Bus controller 320 may provide the gateway for CPU 305 to send and retrieve data from most of computer system 300. For example, bus controller 320 may allow CPU 305 to send and receive data to and from the computer system RAM memory 325 via frontside memory bus 322. Additionally, bus controller 320 may allow CPU 305 to display information to a computer user through an accelerated graphics port (AGP) display card 315 by way of AGP bus 330. While not shown in the architecture diagram of FIG. 3, CPU 305, bus controller 320, RAM memory 325, and other system components may be integrated into a single motherboard.

Note that computer system 300 in FIG. 3 has a peripheral component interconnect (PCI) bus 340 coupled to bus controller 320. Note further that a PCI/ISA bridge 345 couples an industry standard architecture (ISA) bus 380, an Enhanced Intelligent Drive Electronics® (EIDE®) 350, and a universal serial bus (USB) 335 to bus controller 320 by way of PCI bus 340. In various embodiments, storage devices may be coupled to PCI bus 340, PCI/ISA bridge 345, and ISA bus 380. For example, in one embodiment an optical storage drive employing an apparatus for protecting data in the drive may be connected to PCI bus 340 via a small computer systems interface (SCSI) card 355. Alternatively, in another embodiment, a hard drive may be coupled to PCI/ISA bridge 345 and bus controller 320 by way of an EIDE® connector and a flat ribbon cable. Further, in another embodiment, a flash memory drive may be coupled to PCI/ISA bridge 345 by way of a USB port coupled to USB 335. Even further, in yet another embodiment, a tape drive may be connected to a dedicated ISA I/O card in an ISA expansion slot, such as ISA device 375. All storage device variations may comprise different embodiments, with sensitive data stored in each device.

After applying power and during the boot process of computer system 300, BIOS 370 may obtain system-specific information that may uniquely identify system 300. More specifically, BIOS 370 may obtain vital product data (VPD), such as part numbers, serial numbers, and engineering version numbers for the components of computer system 300. For example, BIOS 370 may obtain the part number and serial number for the planar board, the model number of CPU 305, the serial number and version of AGP display card 315, a media access control (MAC) address of an Ethernet or local area network device 360, and a firmware version number of a PCI device 365. Whenever BIOS 370 and a storage device perform a handshake at time of the POST, BIOS 370 may transfer some or all of the VPD obtained earlier in the boot process to the storage device. The storage device may save the VPD information transferred from BIOS 370 to nonvolatile memory contained within the storage device. For example, the storage device may save the serial number of the motherboard in an electrically erasable programmable read only memory (EEPROM) chip, located on a circuit board within the storage device. Whenever computer system 300 is rebooted and the storage device handshakes with BIOS 370 again, the storage device may then compare the VPD saved from the previous boot, which is stored in the EEPROM, with the fresh VPD obtained during the reboot. If the VPD does not match, the storage device may prohibit or ignore read-write requests from computer system 300. In addition, the storage device may even erase the information under specified conditions.

In alternative embodiments, a storage device may obtain system-specific information from a source in the computer system other than BIOS 370. For example, immediately after the boot process, the storage device may generate one or more interrupt requests (IRQs) forcing CPU 305 to stop its current task and respond to the request of the storage device. The request by the storage device may be a request for the serial number, or some other identification number, of a system component. This process of generating a series of IRQs may continue, allowing the storage device to query the different devices in computer system 300, obtain the same information that it could obtain directly from BIOS 370, and store the numbers for security comparison at a later point in time.

Figure 4:
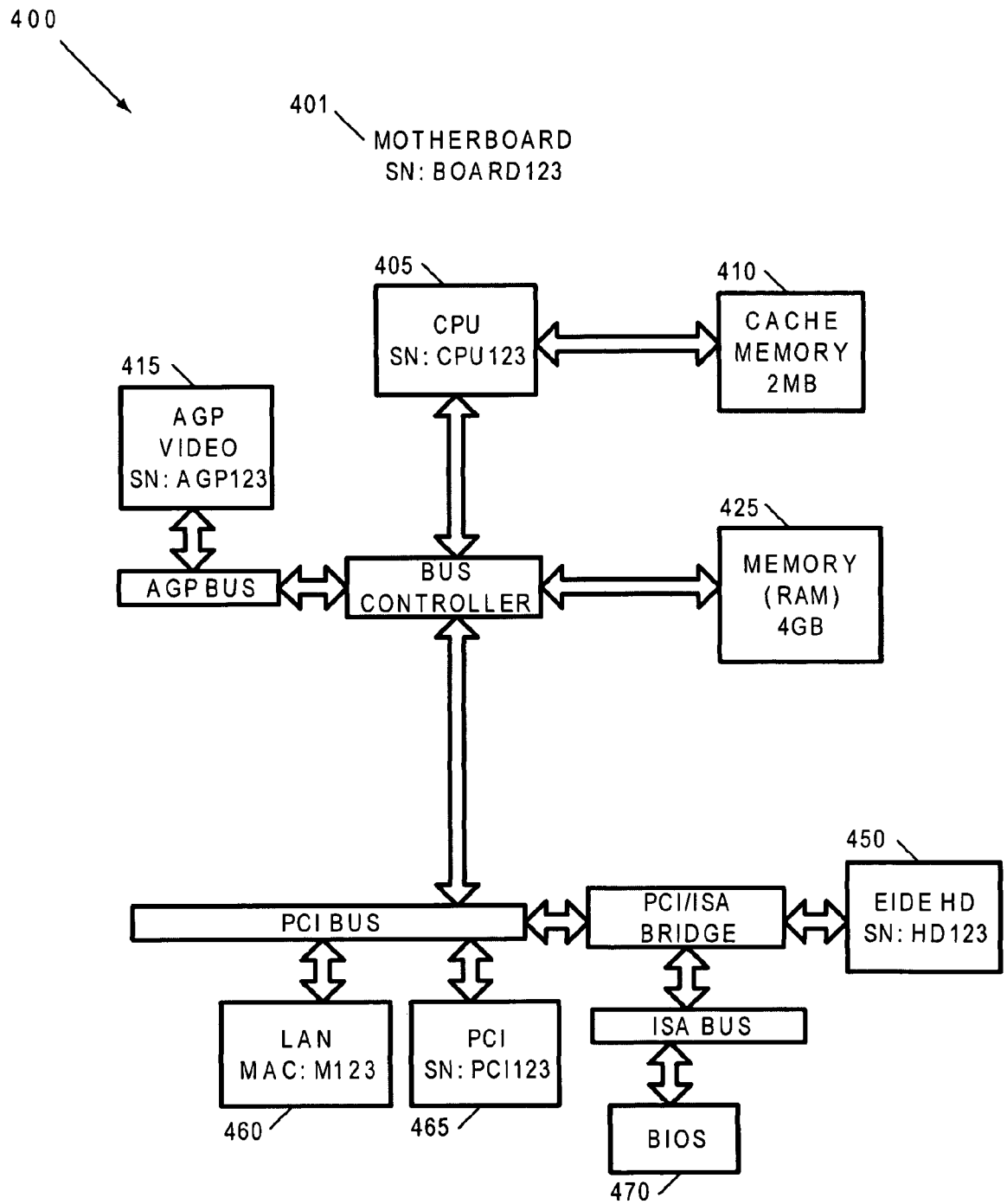
FIG. 4 depicts a system drawing of a computer system with example identification numbers for various system components.
Figure 5:
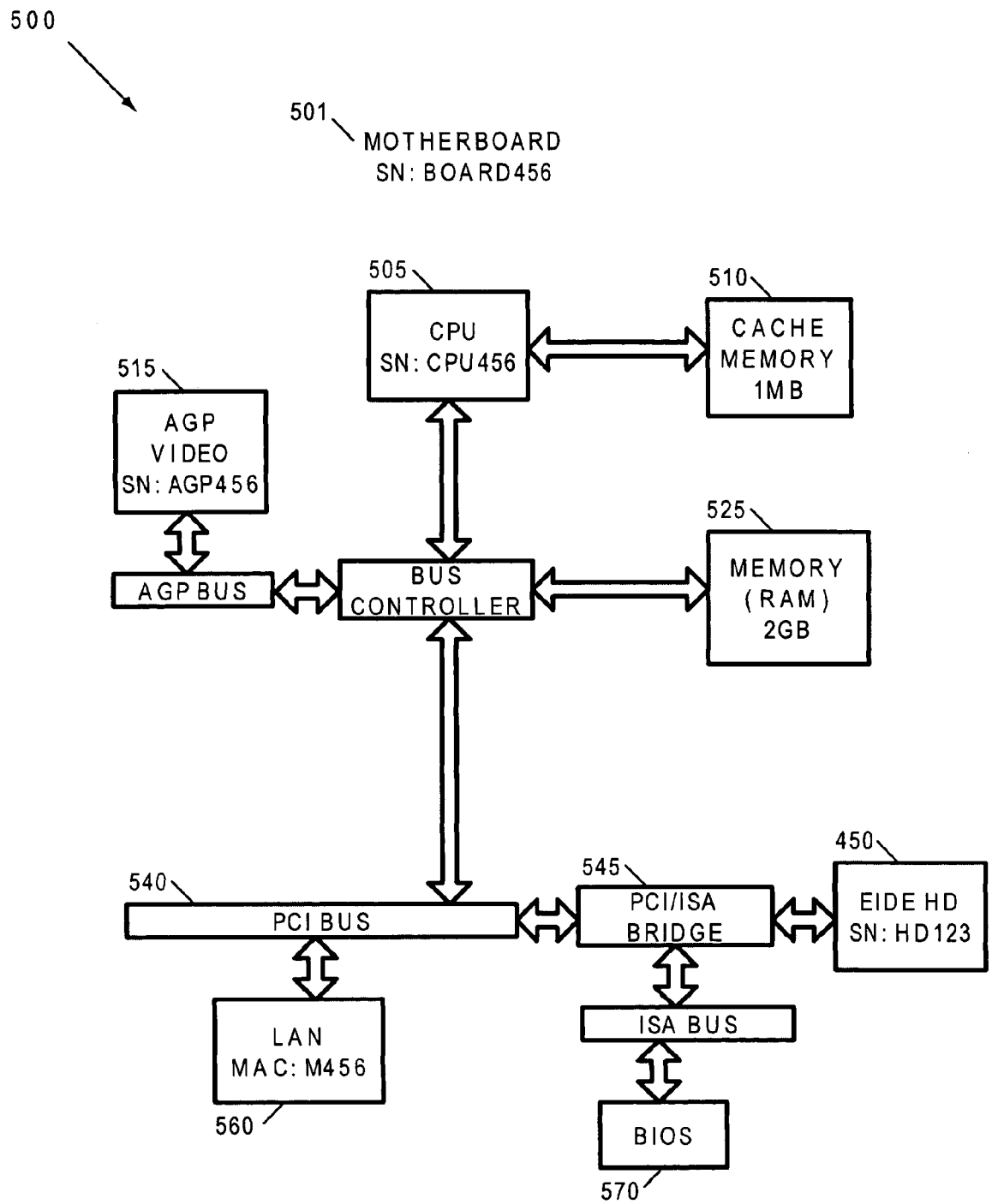
FIG. 5 shows a system drawing of a computer system having identification numbers for various system components, to which a hard drive from a different computer system has been connected.

To examine a more detailed scenario, which will help illustrate how a storage device in a computer system may protect sensitive data within the device, we turn now to FIGS. 4 and 5. Similar to FIG. 3, FIG. 4 depicts what may be a relatively simple computer system 400, having an EIDE®) hard drive 450. Computer system 400 has a CPU 405, two megabytes of cache memory 410, and four gigabytes of RAM memory 425. Note that many of the devices in computer system 400 have unique identifying numbers. CPU 405 has a serial number (SN) of "CPU123"; AGP video card 415 has a serial number of "AGP123"; LAN card 460 has a MAC address of "M123"; and a PCI card 465 has a serial number of "PCI123". Additionally, note that all of these devices may be coupled to the planar board or motherboard 401, which has a serial number of "BOARD123".

When computer system 400 is powered on, it may go through a boot process wherein BIOS 470 obtains all of the serial numbers noted above and stores the numbers in either CMOS memory or even in RAM memory 425. Alternatively, BIOS 470 may simply query the different devices and compare the reported numbers with previously saved numbers to see if any of the device numbers have changed. If not, BIOS 470 may simply leave the numbers stored in CMOS memory alone. Hard drive 450 may handshake with BIOS 470 and obtain the serial numbers that BIOS 470 stored to, say, CMOS memory. Assuming this is the first boot process since hard drive 450 was installed, hard drive 450 may simply store these numbers in nonvolatile memory. Stated more precisely, hard drive 450 may store motherboard 401 serial number "BOARD123", CPU 405 serial number "CPU123", AGP video card 415 serial number "AGP123", LAN card 460 MAC address M123, and PCI card 465 serial number "PCI123" in a flash memory chip located on a circuit board within hard drive 450.

After storing serial and other unique numbers in nonvolatile memory, hard drive 450 may retain these numbers when computer system 400 is turned off. Whenever computer system 400 is booted again, hard drive 450 may again handshake with BIOS 470 and obtain the serial numbers that BIOS 470 stored to CMOS memory during the current boot process. Assuming the system remain unchanged, that is to say that no hardware was either added or removed, the current serial numbers communicated to hard drive 450 by BIOS 470 during the handshaking will match the numbers that hard drive 450 stored to nonvolatile memory. Having detected no system change, hard drive 450 may operate normally and transfer data to and from computer system 400 freely without security restrictions. This cyclical process of booting, transferring the current system serial and other unique numbers from BIOS 470 to hard drive 450, comparing the current numbers with the previously saved numbers, and allowing hard drive 450 to operate without security restrictions may continue for days, weeks, and even years.

Suppose, however, that an owner decides to upgrade her computer system 400 by installing a larger capacity hard drive. Suppose further that after installing the new hard drive that the owner fails to go to the trouble of erasing some proprietary information from the old hard drive 450 and simply resells hard drive 450 on a secondary market to a second owner who installs the hard drive in another computer system. In summation, the sensitive information stored on hard drive 450 may now be in the hands of a party who has interests adverse to the original owner.

FIG. 5 illustrates how hard drive 450 may have been installed in a different computer system 500. In comparing FIG. 5 with FIG. 4, one may note that computer system 500 has a motherboard 501 and CPU 505 with serial numbers of "BOARD456" and "CPU456" as opposed to "BOARD123" and "CPU123", respectively, of computer system 400. Likewise, AGP video card 515 has a serial number of "AGP456" as opposed to "AGP123", and LAN card 560 has a MAC address of "M456" versus "M123". Whenever computer system 500 is booted after installing hard drive 450, hard drive 450 may handshake with BIOS 570 and obtain the serial numbers that BIOS 570 has stored to CMOS memory during the current boot process. Since the overall system hardware has certainly changed from the perspective of hard drive 450, the current serial numbers communicated to hard drive 450 by BIOS 570 during the handshaking after the POST will differ greatly from the numbers that hard drive 450 has stored in nonvolatile memory. Stated differently, hard drive 450 will compare the stored number for motherboard 401, which is "BOARD123", and determine that it differs from the current motherboard 501, namely "BOARD456". Similarly, hard drive 450 will determine that "CPU123" is different from "CPU456", and that "AGP123" differs from "AGP456". Hard drive 450 will also see that the MAC address it stored for LAN card 460, namely "M123" differs from "M456" in the current system, and that computer system 500 no longer has a serial number for any other PCI cards. Additionally, if hard drive 450 stored such information for security verification, it would determine that the current system values for cache and RAM memories, 1 MB and 2 GB, respectively, had changed from the previously stored values of 2 MB and 4 GB. A simple comparison algorithm stored in a ROM chip in the electronics or hard drive 450 may easily determine that the computer system environment has drastically changed, based on the different numbers. Accordingly, hard drive 450 may be designed to reject any read or write requests from computer system 500 after encountering such a substantial change.

In alternative embodiments, hard drive 450 may instead immediately erase any or all information stored within the drive after encountering a change in system serial numbers, or parameters. In other embodiments, hard drive 450 may be designed to ignore or deny any read-write requests from computer system 500, but prompt the user to enter one or more parameters from the original system. For example, assuming the hard drive is owned or possessed by the same person, that person may enter a motherboard serial number or a MAC address from the original computer system 400. If the person successfully enters one of the old serial numbers or other identifying information, hard drive 450 may be programmed to store the new system parameters and use them for all future computer system 500 comparisons.

Figure 6:
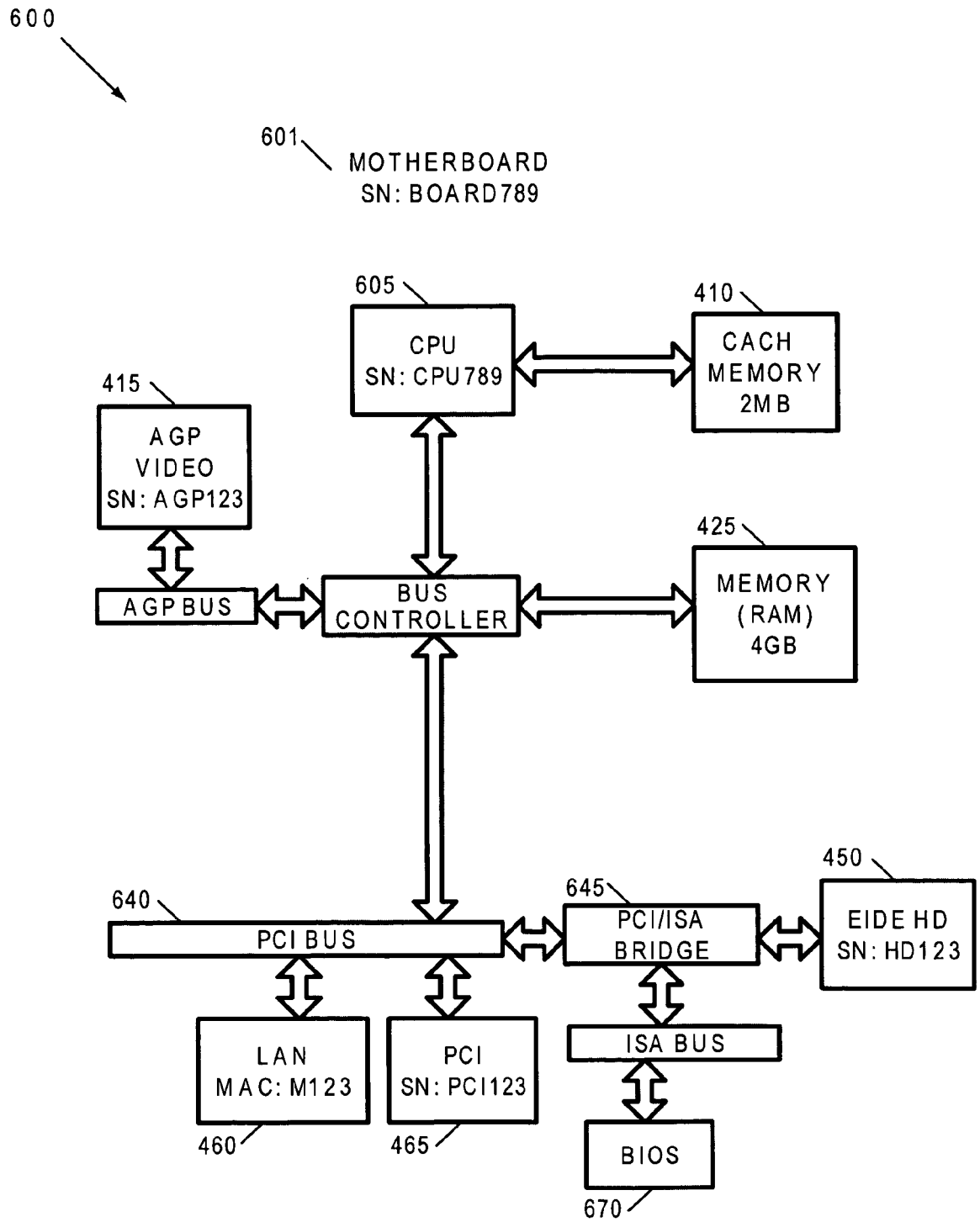
FIG. 6 depicts a computer system drawing wherein two device component identification numbers have been changed.

One may note, however, that computer owners may periodically replace computer system components. Owners may want to upgrade portions of their computers, but not totally change all hardware. For example, an owner may simply upgrade the motherboard and CPU but leave all other components unchanged. FIG. 6 may depict such a scenario.

Similar to our previous example, assume that the computer owner starts out with computer system 400 shown in FIG. 4. The hard drive 450 of FIG. 4 may faithfully operate for several years without invoking any security protection measures. Computer system 400 and hard drive 450 may do this because hard drive 450 continually queries BIOS 470 and continues to see the same system parameters after each startup because the system hardware continues to remain the same. However, if the computer owner decides to upgrade computer system 400 by only replacing motherboard 401 and CPU 405, the computer owner may end up with a computer system similar to the one shown in FIG. 6. Note that in comparing computer system 400 in FIG. 4 with new computer system 600 in FIG. 6, all computer system components have remained unchanged, save two exceptions, motherboard 601 with a new serial number of "BOARD789" and CPU 605 with a new serial number of "CPU789", as well as the associate hardware that may be embedded in motherboard 601.

After changing out two system components in this manner, upon the next boot process hard drive 450 may handshake with BIOS 670 and obtain the serial numbers that BIOS 670 has stored to CMOS memory during the current boot process. In comparing all of the serial numbers and parameters this time, hard drive 450 will determine that all the numbers are unchanged except for the serial numbers for motherboard 601 and CPU 605. In other words, hard drive 450 will note that the current values for motherboard 601 and CPU 605, which are "BOARD789" and "CPU789", respectively, do not match the stored values of "BOARD123" and "CPU123", respectively.

When hard drive 450 encounters a slight system change, such as the scenario just described instead of a substantial change, then hard drive 450 may be programmed to respond in a variety of different ways. For example, in one embodiment, hard drive 450 may simply reject read-write request as previously described in other embodiments. However, hard drive 450 may also be programmed to perform a type of "system voting", wherein the hard drive may make a determination of whether the system has sufficiently, or substantially, changed to warrant invoking any hard drive security measures. Stated differently, hard drive 450 may determine that stored system parameters for AGP video card 415, cache memory 410, RAM memory 425, LAN card 460, and PCI card 465 match those reported by BIOS 670 during the current boot process. Additionally, hard drive 450 may be configured to recognize that only two (2) out of the seven (7) system parameters, namely the parameters for motherboard 601 and CPU 605, have changed. Recognizing that most components are the same and that only a couple of the parameters have changed, hard drive 450 may be configured to accept this change as a normal upgrade of computer system 400. Accordingly, hard drive 450 may then store the new parameters for motherboard 601 and CPU 605, replacing the older parameters for motherboard 401 and CPU 405. Consequently, on the next boot cycle, hard drive 450 may detect no system changes because the system parameters reported by BIOS 670 will match those stored by hard drive 450.

In a different variation of this embodiment, hard drive 450 may allow only one system parameter to change at a time. That is to say, hard drive 450 may not invoke any security measures when detecting only one parameter number change. However, hard drive 450 may erase the stored information if encountering more than one parameter changes between consecutive boot cycles. Alternatively, in other embodiments, hard drive 450 may continue to boot and store modified or changed system parameter changes, so long as at least one of the parameters from the previous boot cycle match. In the situation where all parameters have changed, hard drive 450 may then invoke one of a range of different security measures, such as prompting the owner or user to enter at least one of the previous system parameters, or requiring that the owner reboot the system after installing one of the previous system components.

Figure 7A:
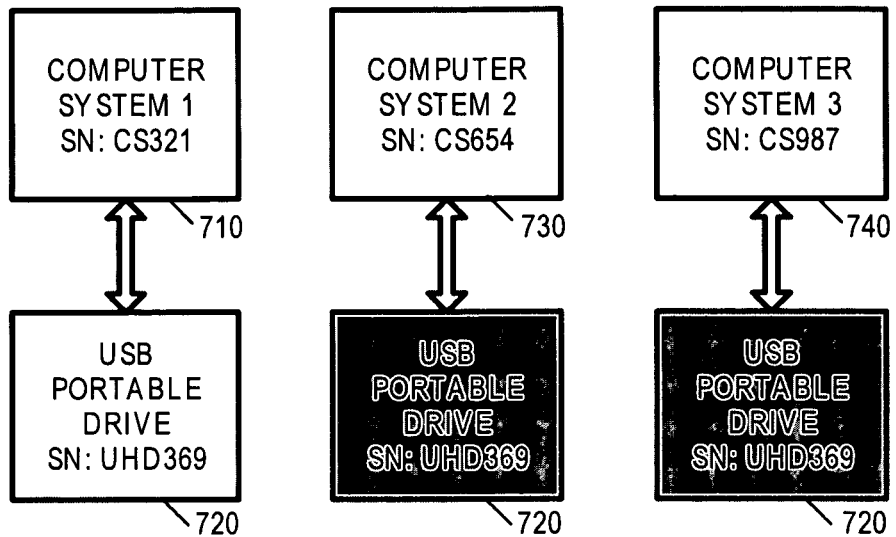
FIGS. 7A-7B illustrate how a portable storage device may be used for transferring data between three different computer systems.

To demonstrate how an embodiment may be implemented for a portable storage device, we turn now to FIG. 7A. FIG. 7A illustrates one method for how a portable storage device may be used to transfer information among a relatively small number of computers, while minimizing the potential of third parties with adverse interests from accessing the information.

Along the top of FIG. 7A are shown three computer systems, a first computer system 710, a second computer system 730, and a third computer system 740. For the sake of discussion, one may assume that such an arrangement of computer systems may represent a small office of computers with no network connectivity. Alternatively, such a system may comprise three separate computers for three distinct office locations for a small business. Note that the first computer system 710 has a serial number of "CS321", the second computer system 730 has a serial number of "CS654", and the third computer system 740 has a serial number of "CS987". These numbers may be unique numbers for each of the computer systems, such as motherboard serial numbers, LAN card MAC addresses, and other similar numbers.

A user may have a USB portable drive 720 that he wishes to use for transferring information between each of the three computer systems. In different embodiments, the type of portable drive may vary. For example, the user may have a portable USB hard drive employing magnetic media as a main storage medium. In an alternative embodiment, the user may have a portable flash memory drive. Additionally, while the embodiment of FIG. 7A describes the portable drive as a USB drive, in other embodiments the portable drive may connect to computer systems by way of another interface, such as a parallel port or an IEEE-1394 High Performance Serial Bus port.

In FIG. 7A, USB portable drive 720 shows to be connected to the first computer system 710. The user may use USB portable drive 720 to transfer information to and from the first computer system. The user may disconnect USB portable drive 720 from the first computer system 710 and connect it to either the second computer system 730 or the third computer system 740. For example, the user may want to synchronize applications and data files among the three computer systems.

Upon connecting USB portable drive 720 to any one of the three computer systems, USB portable drive 720 may derive power from the USB connection, power up the drive, and perform a set of internal diagnostics. After performing such diagnostics, the drive may synchronize itself with the operating system by communicating with the computer system and registering pertinent information with the operating system so as to appear as a connected drive within on of the operating system display screens. For example, after connecting to the first computer system 710, USB portable drive 720 may power up, perform the set of internal diagnostics, and communicate and exchange information with the operating system, the end result being that USB portable drive 720 shows up as drive "E:" on an operating system display screen.

After powering up and performing the set of internal diagnostics, USB portable drive 720 may transmit a series of queries to the first computer system 710, requesting one or more unique system identification numbers. For example, the drive may request the serial number of the motherboard, a MAC address of an internal network communications card, the serial number of the operating system, or some other unique identification number. Upon receiving the identification numbers, USB portable drive 720 may store them in nonvolatile memory. Alternatively, in other embodiments, USB portable drive 720 may even store the numbers in the drive storage medium, such as on a platter of the drive, arranged in sectors and tracks, or in flash memory.

USB portable drive 720 may be designed as drive that may only be connected to a predetermined number of devices. For example, like FIG. 7A, USB portable drive 720 may be designed to only connect with three different computer systems. In other embodiments, USB portable drive 720 may be designed or programmed to only connect with two different computers. USB portable drive 720 may "register" each computer system that it initially connects to, until it registers the predetermined maximum number of systems. For example, USB portable drive 720 may be purchased, brand new, and designated as a three-system drive. After purchasing, the user may connect USB portable drive 720 to the first computer system 710, whereupon USB portable drive 720 may register, or store an identification number of the first computer system in nonvolatile drive memory. For example, upon connecting to the first computer system 710 for the first time, USB portable drive 720 may store "CS321" in nonvolatile memory. Similarly, USB portable drive 720 may be connected to the second computer system 730 and the third computer system 740 where it will also store "CS654" and "CS987" in nonvolatile memory.

Figure 7B:
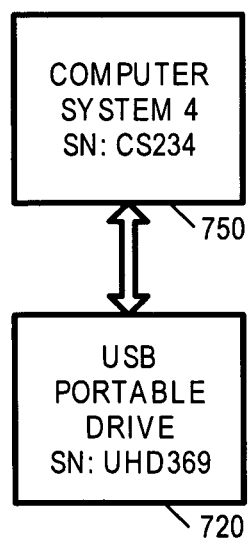

After registering three different computer systems, which may be the designated or predetermined maximum number of computer systems to which USB portable drive 720 was designed to connect, USB portable drive 720 may refuse to accept any more new computer configurations. For example, attempting to connect USB portable drive 720 with a fourth computer system, such as computer system 750 shown in FIG. 7B, may result in USB portable drive 720 causing the operating system to display an error message, such as "The maximum number of secure systems has been configured". However, the user may disconnect USB portable drive 720 from computer system 750 and reconnect it with either the first computer system 710, the second computer system 730, and the third computer system 740, which are all three "registered" drives.

Upon connecting to a computer system, USB portable drive 720 may request certain identification numbers from the computer system, compare the identification numbers received from the computer system with the numbers that the USB portable drive 720 has stored in nonvolatile memory, and permit access to data on the drive if the numbers match. Summarized using different terminology, USB portable drive 720 may be "married" to a predetermined number of computer systems. After being married to those computer systems, USB portable drive 720 may freely exchange drive information with those systems. However, attempting to connect USB portable drive 720 to an unauthorized or "unmarried" drive may result in the drive displaying an error message and refusing access to the information.

In alternative embodiments, USB portable drive 720 may be configured to respond differently after being connected with an unauthorized computer system. For example, the USB portable drive 720 may immediately erase the all the information that it has stored, information other than the registered identification numbers. In other embodiments, USB portable drive 720 may allow a designated number of unauthorized computer system connection attempts before erasing the information. For example, USB portable drive 720 may be configured to allow five unsuccessful connections, or authorization attempts, simply ignoring read-write requests after being coupled to an unauthorized system. USB portable drive 720 may allow up to four more such unauthorized connection attempts. If a user attempts a sixth connection of USB portable drive 720 with an unauthorized computer, USB portable drive 720 may immediately react by erasing all information.

Also, similar to previously mentioned embodiments, USB portable drive 720 may recognize slight system changes and "register" the altered system configuration information. Alternatively, in ultra-secure applications, such as storing information for military intelligence applications or storing company trade secret information, USB portable drive 720 may erase all data immediately upon detecting a system parameter change, even though USB portable drive 720 may be connected with an authorized system. For example, USB portable drive 720 may be connected with the first computer system 710, and register the serial numbers of both the motherboard and the operating system as identification numbers. USB portable drive 720 may allow free access to the information stored within USB portable drive 720 for a period of time, so long as the identification numbers remain the same. However, if the user upgrades the motherboard of the first computer system 710, which may cause it to report a different motherboard serial number, then USB portable drive 720 may detect such a change and erase the information in the drive, even though the serial number of the operating system may not have changed.

Figure 8:
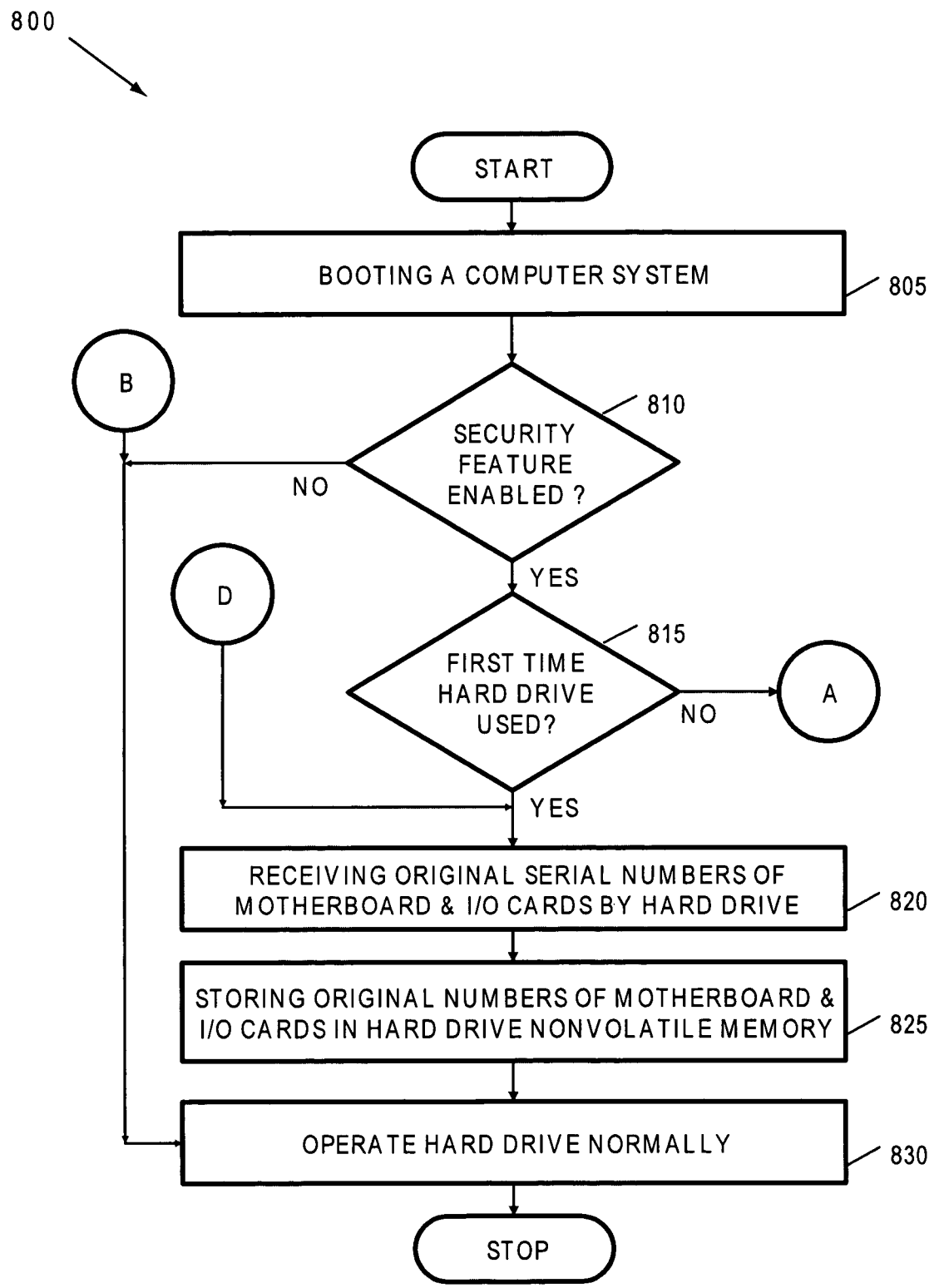
FIGS. 8-10 illustrate a method for securing data in a hard disk, wherein a computer user must enter a correct key code in order to access information on the drive.

Continuing now with our overall discussion of methods for protecting sensitive information in storage devices, we focus our attention on FIG. 8. FIG. 8 depicts a flowchart 800 of an embodiment for a method of protecting sensitive information stored in a hard drive that is connected to a computer system. Flowchart 800 begins with initiating a boot sequence of the computer system (element 805). For example, the boot sequence may occur after applying power, or after performing a reset, or warm boot, of the computer system. The computer system may be a personal computer, a laptop, a palm-held, or even a mainframe computer system.

In the embodiment of FIG. 8, the hard drive may have the option of enabling or disabling the data security feature. For example, the drive may have jumpers or switch settings that determine whether the security feature is enabled or disabled. Once enabled and used as a secured drive, however, the drive may prohibit disabling the security feature. Alternatively, the drive may erase all stored information if the security feature is changed from the "enable" state to the "disable" state, before allowing the drive to store and retrieve data. In other embodiments, the drive may be purchased with special software that may access the operating program of the hard drive, such that the security feature may be enabled or disabled. For example, the drive may be issued from the factory with a default configuration having the security feature disabled. A user may enable the security feature by running the software during the installation process. Again, though, the drive may prohibit changes to the security configuration once enabled, or may erase stored information whenever the feature is disabled.

During the boot process, or shortly thereafter, the drive may check to determine if the security feature is enabled (element 810). If the security feature is not enabled, the drive may operate normally as any other drive or data storage devices (element 830). However, when the security feature is enabled, the hard drive may make a second initial determination of whether the drive has previously been used to store data (element 815). The drive may make this determination by examining dedicated sections of nonvolatile drive memory reserved for storing information pertaining to the computer system. For example, the hard drive may examine a portion of nonvolatile memory reserved for storing the serial number of a computer to which the drive has been connected. If the memory contains no data, the drive may have not been used before. Alternatively, the memory location may contain data, indicating the drive has been used previously.

If the drive determines that it has never been used to store data before, then the drive may proceed by retrieving the serial numbers of the attached computer system motherboard and I/O cards (element 820). Alternative embodiments may obtain other information, such as memory size and MAC addresses. Even further embodiments may receive only a single identification number, instead of multiple numbers. After receiving the serial numbers of the attached computer system, the drive may then store the numbers (element 825) in nonvolatile memory, or even the storage medium of the drive. After completing this original receiving and storing of identification numbers, the drive may start operating normally (element 830).

Figure 9:
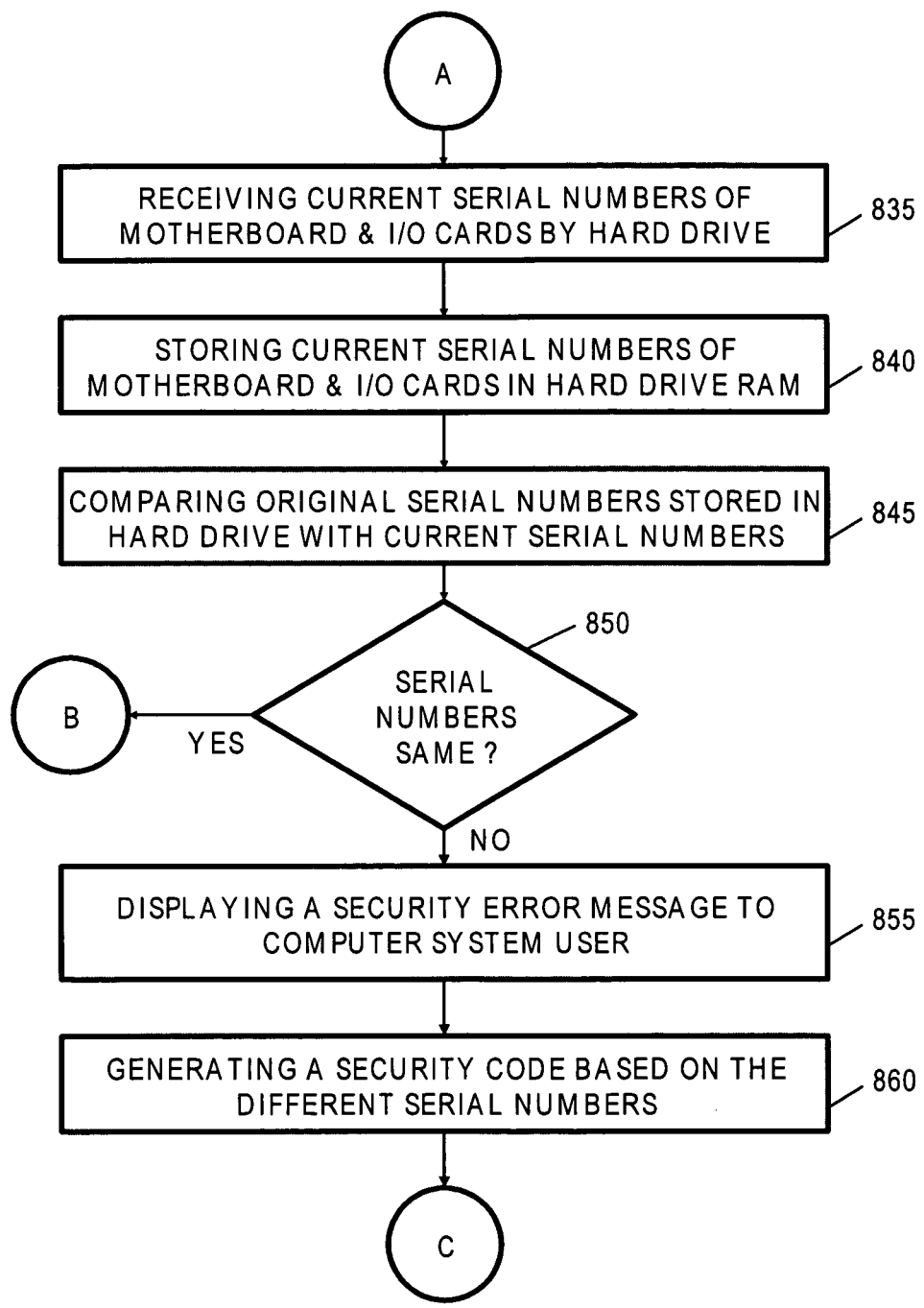

If the drive determines that is has previously been used to store data before, then the drive may proceed by retrieving the serial numbers of the attached computer system motherboard and I/O cards (FIG. 9, element 835) and this time storing them in RAM memory of the drive (element 840). Since the drive has been used in a system before, the drive may now ensure that it is in the same computer system before allowing access to information stored on the hard drive. The drive may ensure that the computer system has not changed by comparing the serial numbers obtained during the current boot process, stored in hard drive RAM, with the previously stored serial numbers stored in nonvolatile memory (elements 845 and 850).

If the current serial numbers match the stored serial numbers, the drive may proceed by operating normally (element 830), freely transferring information stored on the drive to and from the computer system. However, if the hard drive determines that the numbers are different, it may cause the computer system to display an error message to the computer user (element 855). For example, the hard drive may report back an error code to the computer system and associated operating system, such that the operating system simply displays "Fixed Disk Error: Code 123". Such a message may require the user to look up the code number in a manual accompanying the hard drive. Alternatively, the hard drive may cause the operating system to display an error message such as "Fixed Disk Security Error: Changed System".

Figure 10:
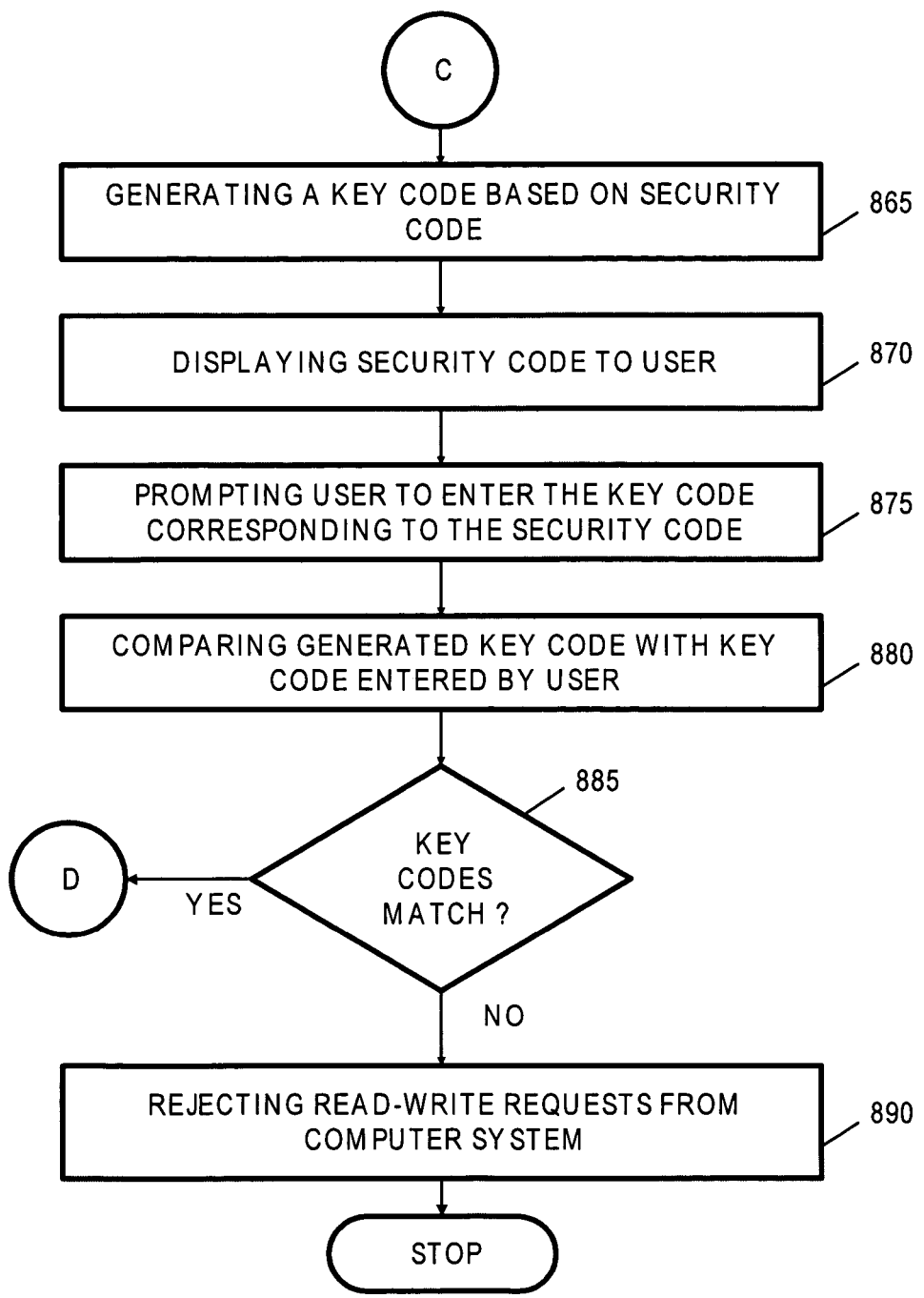

After causing the computer and operating systems to display this initial error message, the drive may continue by generating a security code, which may be derived from the different serial numbers (element 860). The hard drive may also generate a key code, which may be derived from, or based on, the previously generated security code (FIG. 10, element 865). Storing both of these generated codes in hard drive RAM, the drive may then proceed by only displaying the security code to the user (element 870), and prompting him to enter the corresponding key code (element 875). This process of generating a security code and associated key code internally by the drive, may allow the user the option of contacting the hard drive manufacturer for the key code. For example, if a user modifies his computer system, but still wants to use the hard drive in the new system without losing all of the previously saved data, he may call the hard drive manufacturer. The hard drive manufacturer may first verify the identity of the user, which may be accomplished by verifying warranty registration information that the user may have sent in to the manufacturer. The hard drive manufacturer may then provide the user with the key code, which the user may enter to obtain access to information on the drive.

After the user enters the correct key code, and the hard drive verifies that the entered code matches the generated code (element 885), the hard drive may proceed by receiving and storing the current motherboard and I/O card serial numbers (elements 820 and 825). Storing the revised "original" system numbers in this manner may allow the drive to operate in the modified system as though the new serial numbers were the original system serial numbers. If, however, the user enters a wrong key code, the drive may proceed by rejecting any read or write requests from the computer system (element 890). Rejecting read-write requests in this manner may allow the drive to protect the drive data in case the hard drive somehow ends up in the hands of an unauthorized third party.

Another embodiment of the invention is implemented as a program product for use with a storage device to protect sensitive information stored in the device, in accordance with, e.g., flowchart 800 as shown in FIG. 8. The program(s) of the program product defines functions of the embodiments (including the methods described herein) and can be contained on a variety of data and/or signal-bearing media. Illustrative data and/or signal-bearing media include, but are not limited to: (i) information permanently stored on non-writable storage media (e.g., read-only memory devices within the hard drive); and (ii) alterable information stored on writable storage media (e.g., magnetic media of a hard drive). Such data and/or signal-bearing media, when carrying microprocessor-readable instructions that direct the functions of the present invention, represent embodiments of the present invention.

In general, the routines executed to implement the embodiments of the invention, may be part of a storage device operating system or a specific component, program, module, object, or sequence of instructions contained within memory of the storage device. The microprocessor program of the present invention may be comprised of a multitude of instructions that will be translated by the microprocessor into a machine-readable format and hence executable instructions. Also, the programs may be comprised of variables and data structures that either reside locally to the program or are found in memory or other storage devices. In addition, various programs described hereinafter may be identified based upon the application for which they are implemented in a specific embodiment of the invention. However, it should be appreciated that any particular aforementioned program nomenclature is used merely for convenience, and thus the invention should not be limited to use solely in any specific application identified and/or implied by such nomenclature.

One skilled in the art of computing and data security will readily appreciate the flexibility and opportunities that the various embodiments for protecting sensitive data contained in storage devices afford the field of information storage. These examples are only a few of the potential cases wherein the methods of protecting sensitive information in storage devices, or machines and media that accomplish essentially the same, greatly data storage device security.

It will be apparent to those skilled in the art having the benefit of this disclosure that the present invention contemplates methods, apparatuses, and media to protect sensitive information in information storage devices. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Further, embodiments may achieve multiple objectives but not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
receiving a first set of one or more bits by a mass storage device, wherein the first set is derived from identification data of a hardware configuration of a first computer system;
comparing in the mass storage device of the first set with a second set of one or more bits, wherein the second set is stored in the mass storage device, wherein further the comparison is to detect relocation of the mass storage device from a second computer system;
granting access for the first computer system to data in the mass storage device if the first set and the second set are substantially similar based upon the comparison; and
granting access to the data in the mass storage device after entering a serial number for a second component attached to the first computer system, if a first component was altered in the first computer system.

2. The method of claim 1, further comprising storing the second set of one or more bits in the mass storage device after the storage device is installed in the first computer system and initialized.

3. The method of claim 1, further comprising erasing the data in the mass storage device if the first set of one or more bits and the second set of one or more bits are substantially dissimilar, wherein the dissimilarity is due to relocation of the mass storage device from the second computer system to the first computer system.

4. The method of claim 3, wherein erasing the data in the mass storage device occurs after issuing a special command to the mass storage device, wherein further the mass storage device is configured to register computer systems and cause an error message to be displayed when a user connects the mass storage device to an unregistered computer system.

5. The method of claim 3, wherein erasing the data in the mass storage device occurs after a number of unsuccessful access attempts.

6. The method of claim 3, further comprising allowing read requests and write requests transmitted to the mass storage device after erasing the data.

7. The method of claim 1, further comprising allowing read requests transmitted to the mass storage device after issuing an authentication command to the mass storage device.

8. The method of claim 1, further comprising allowing a user of the first computer to change the second set of one or more bits from an old value to a new value after entering the old value.

9. The method of claim 1, further comprising rejecting read requests transmitted to the mass storage device, wherein further receiving a first set of one or more bits by the mass storage device comprises receiving the first set by a hard drive.

10. The method of claim 1, wherein granting access if the first set of one or more bits and the second set of one or more bits are substantially similar, comprises granting access if at least one portion of the first set equals a second portion of the second set, wherein further the second set is derived from at least one of a serial number and a model number of the second computer system.

11. A mass storage device comprising:
a comparator to compare a first set of one or more bits with a second set of one or more bits, wherein the second set is stored in the mass storage device and the first set is derived from identification data of a hardware configuration of a computer system, wherein further the comparison is to detect relocation of the mass storage device from another computer system; and
an access controller to grant access for the computer system to data in the mass storage device based upon a comparison between the first set and the second set if the first set and the second set are substantially similar and to grant access to the data in the mass storage device after entry of a serial number for a second component attached to the first computer system, if a first component was altered in the first computer system.

12. The apparatus of claim 11, further comprising a writing element coupled to the access controller to erase the data in the mass storage device if the first set and second set are substantially dissimilar, wherein the change of the configuration comprises a changed media access control (MAC) address due to removal of hardware of the computer system.

13. The apparatus of claim 11, wherein the access controller grants access, via logic of a state machine of the mass storage device, for the computer system upon receiving an authorization command from the computer system, wherein further the mass storage device comprises a motor and a circuit board.

14. The apparatus of claim 11, wherein the access controller receives the first set of one or more bits from the computer system during a boot process and compares the first set with the second set of one or more bits stored in nonvolatile memory of a circuit board in the mass storage device, wherein further the identification data of the hardware configuration is derived from a serial number or a model number of the hardware configuration of the computer system.

15. The apparatus of claim 11, wherein the access controller receives the first set of one or more bits from the computer system and compares the first set with the second set of one or more bits stored in magnetic media of a platter of the mass storage device.

16. A computer system comprising:
a mass storage device comprising:
a comparator to compare a first set of one or more bits with a second set of one or more bits, wherein the second set is stored in the mass storage device and the first set is derived from identification data of a hardware configuration of a computer system, wherein further the comparison is to detect relocation of the mass storage device from another computer system; and
an access controller to grant access for the computer system to data in the mass storage device in response to a comparison between the first set and the second set if the first set and the second set are substantially similar and to grant access to the data in the mass storage device after entry of a serial number for a second component attached to the first computer system, if a first component was altered in the first computer system; and
an input-output card to communicate with the mass storage device.

17. The computer system of claim 16, further comprising a writing element coupled to the access controller to erase the data in the mass storage device if the first set and second set are substantially dissimilar, wherein the mass storage device comprises a hot-pluggable drive, wherein further the hot-pluggable drive comprises a jumper to disable a data security feature of the hot-pluggable drive.

18. The computer system of claim 16, wherein the access controller grants access for the computer system to the data upon receiving an authorization command from the computer system.

19. The computer system of claim 16, wherein the access controller grants access for the computer system to the data upon a user entering a third set of one or more bits into the computer system, the third set matching one or more bits of the second set.

* * * * *